United States Patent [19]

Magosch et al.

[11] 4,004,878
[45] Jan. 25, 1977

[54] PROCESS FOR THE PREPARATION OF PILLING-RESISTANT FIBER PRODUCTS FROM POLYESTERS

[75] Inventors: Karl-Heinz Magosch; Jörn Rüter, both of Marl, Germany

[73] Assignee: Chemische Werke Huls Aktiengesellschaft, Marl, Germany

[22] Filed: Oct. 7, 1975

[21] Appl. No.: 620,286

[30] Foreign Application Priority Data

Oct. 15, 1974 Germany .................... 2448954

[52] U.S. Cl. ................. 8/115.5; 8/DIG. 4; 260/75 R
[51] Int. Cl.² ............................ D06M 11/02
[58] Field of Search .......... 8/115.5, DIG. 4

[56] References Cited

UNITED STATES PATENTS

| | | | |
|---|---|---|---|
| 2,938,811 | 5/1960 | Hermes | 117/102 |
| 2,945,008 | 7/1960 | Caldwell et al. | 260/75 R |
| 3,834,868 | 9/1974 | Tatsuoka et al. | 8/130.1 |

*Primary Examiner*—John Kight, III
*Attorney, Agent, or Firm*—Gilbert L. Wells

[57] ABSTRACT

Method for producing pilling-resistant fiber products of polyesters containing 0.05 – 5.0 molar percent, based on the acid component, of dicarboxylic acid groups which contain acetal groups and/or of a diol which contains acetal groups, wherein threads and fibers produced from such polyesters, as well as woven fabrics and knits made therefrom, are treated with aqueous acids.

7 Claims, No Drawings

PROCESS FOR THE PREPARATION OF PILLING-RESISTANT FIBER PRODUCTS FROM POLYESTERS

CROSS REFERENCES TO RELATED APPLICATIONS

Applicants claim priority under 35 U.S.C. 119 for Application P 24 48 954.1, filed Oct. 15, 1975 in the Patent Office of the Federal Republic of Germany.

The disclosures of assignee's copending Applications Serial Nos. 536,987 and 536,988, both filed Dec. 27, 1974, are incorporated herein to show the state of the art of making low pilling effect polyester fibers.

Application Ser. No. 536,987 now U.S. Pat. No. 3960686 shows the state of the art of preparing low pilling effect polyester fiber products by irradiation of a copolyester which contains a substituted cyclobutanedimethanol with high energy light.

Application Ser. No. 536,988 shows the state of the art of preparing low pilling effect polyester fiber products by adding a vinyl copolymer having more than two carboxyl and/or hydroxyl groups to the ethylene terephthalate polyester melt polymerization.

BACKGROUND OF THE INVENTION

The field of the invention is synthetic resins from polyhydric alcohol-polycarboxylic acid reaction products. The invention is particularly related to a method of preparing pilling-resistant fiber products from polyesters containing 0.05 – 5.0 molar percent, based on the acid component, of dicarboxylic acid groups which contain acetal groups and/or of a diol which contains acetal groups.

The state of the art of the present invention may be ascertained by reference to the Kirk-Othmer "Encyclopedia of Chemical Technology", Vol. 16 (1968), pages 143-159, under the section entitled "Polyester Fibers"; U.S. Pat. Nos. 3,335,211 and 3,391,123 which show the state of the art of improving the pilling effect of polyester fibers; and U.S. Pat. No. 2,945,008 which shows the preparation of the polyesters used in the present invention.

U.S. Pat. No. 2,945,008 discloses the preparation of a high melting linear highly polymeric condensation polymer of (A) at least one bifunctional compound selected from the group consisting of carbonic acid, a dicarboxylic acid containing from 2 to 20 carbon atoms and an organic diisocyanate containing from 6 to 23 carbon atoms, and (B) at least one bifunctional glycol composed of from 50 to 100 mole percent of a spiro glycol having the following formula:

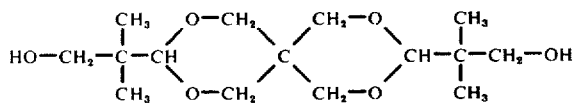

and from 0 to 50 mole percent of an aliphatic glycol having from 2 to 12 carbon atoms, the relative proportions of (A) and (B) constituents being such as to constitute a polymer selected from the group consisting of polyesters and polyurethanes, which polymer melts at between about 150° C and about 270° C.

Threads and fibers of polyethylene terephthalate have gained great importance in the clothing industry due to the large number of excellent properties, such as a high melting point, resistance to chemicals, heat, hot water, and light, as well as their mechanical properties.

However, besides the numerous advantages, polyester fibers also exhibit disadvantages. One of these is the so-called pilling effect. The latter originates from the fact that during the wearing of such fabrics, threads are pulled out of the fabric structure and are twisted into little balls fixedly anchored in the fabric. These pills impart an unattractive appearance to the fabric surface and thereby impair the quality of the respective garment.

A great number of attempts have been made in the past to overcome this disadvantage inherent in the polyester by means of various measures.

The prior art process most frequently employed resides in reducing the molecular weight of the polyester, with correspondingly reduced specific viscosities (abbreviated hereinbelow as RSV) of about 0.35 – 0.45 dl./g. (measured in phenol/tetrachloroethane 60/40 at 25° C) and a concomitant decrease in the tensile strength of the thread as disclosed in Japanese Patent Application 24 932/65. However, the melt spinning of such a material causes considerable difficulties, since the melt is of a very thinly fluid consistency.

Another possibility resides in producing polyesters containing monomeric compounds, such as alcohols or carboxylic acids with three or more functional groups, e.g., glycerin, pentaerythritol, or trimesic acid, as disclosed in German Published Application 1,928,436. In this method, partially branched polyesters are obtained which, as compared with their molecular weight, have a higher melt viscosity than is the case in strictly linear products.

Also, several attempts have been made to chemically weaken polyester fibers as well as fabrics manufactured therefrom subsequently, by treating the same with water, soda, ammonia, hydrazine, amines, carboxylic acids, or alcohols at elevated temperatures, as disclosed in Czechoslovakian Pat. 108,689; Dutch Pat. No. 91,330; French Patent 1,551,050; Japanese Pat. No. 7,122,174; and German Published Application 1,024,482. However, it was found that such a degradation can be controlled and/or made reproducible only with difficulty. In many prior art cases, attempts have been made to generate weakened sites in the molecule where subsequently a hydrolytic cleavage is effected by the incorporation of chain members with hetero atoms, especially silicon, as disclosed in U.S. Pat. No. 3,335,211 and German Published Application 1,273,123; boron, as disclosed in U.S. Pat. No. 3,391,123 and German Published Application 1,469,127, or aluminum as disclosed in German Published Application 1,545,039, which also leads to branching of the chain. Even in this hydrolytic cleavage process, the reproducibility of the results meets with difficulty. Besides, it is necessary to operate under absolutely anhydrous conditions until the point of time where the desired hydrolytic degradation takes place. It is generally known that this aspect causes particular difficulty. The conventional prior art processes thus are not as yet satisfactory in all respects.

SUMMARY OF THE INVENTION

Having in mind the limitations of the prior art, it is an object of the present invention to develop an improved process for the production of pilling-resistant polyester fibers and polyester threads and woven fabrics and knit materials produced therefrom.

This object is achieved, in accordance with the present invention, by treating the threads and fibers prepared from the acetal-group-containing polyesters, as well as the fabrics and knits produced therefrom, with aqueous acids.

These polyesters which contain acetal groups are known. They can be manufactured, for example, according to U.S. Pat. No. 2,945,008.

DESCRIPTION OF THE PREFERRED EMBODIMENTS

Suitable polyesters consist, on the one hand, entirely or predominantly of polyethylene terephthalate or of polyethylene terephthalate modified with up to 15 molar percent of other dicarboxylic acids, such as isophthalic acid, phthalic acid, diphenyl dicarboxylic acid, 4,4'-sulfonyldibenzoic acid, 1,4-cyclohexane-dicarboxylic acid, 1,5- or 2,6-naphthalenedicarboxylic acid, adipic acid, sebacic acid, 1,10-decanadicarboxylic acid and/or other diols, such as 1,4- or 1,3-dimethylolcyclohexane, 1,3-propanediol, 1,4-butanediol, 1,6-hexanediol, 3,3,5-trimethyl-1,6-hexanediol, or neopentyl glycol; and, on the other hand, of 0.05 – 5.0 molar percent, based on the acid component, of a compound containing acetal groups which is bifunctional with respect to the polyesterification, i.e., which contains two esterifiable groups. Thus, diols or dicarboxylic acids containing acetal groups are involved.

In this connection, a decisive aspect is that the acetal grouping be in the polyester main chain. The meaning of this can be seen from the following compounds, formulated merely as examples:

The polyesters are suitably produced in the usual manner by first conducting an interesterification of, for example, the dicarboxylic acid methyl esters with glycols at 150° – 250° C, especially at 180° – 200° C in the presence of 0.01 – 1.0 percent by weight of interesterification catalysts, such as calcium salts, zinc salts, or manganese salts, preferably the acetates, and by a subsequent polycondensation of the low molecular intermediate products thus obtained at 200° – 350° C, especially at 250° – 300° C in the presence of 0.001 – 0.1 percent by weight of polycondensation catalysts, such as antimony, germanium, titanium, or gallium compounds, preferably antimony trioxide, germanium dioxide, gallium lactate, titanium alcoholates, etc.

The addition of sodium carbonate or potassium carbonate, borax, or other weakly basic compounds can be advantageous during the polycondensation, for example in amounts of 0.01 – 2 percent by weight, based on the acid component.

In order to inactivate the interesterification catalysts, phosphorus (III) or phosphorus (V) compounds are suitably added before the polyesterification and suitable compounds in this connection are the customary substances, such as phosphorous acid, phosphoric acid, or organic phosphites with alkyl or aryl groups, e.g. triphenyl phosphite, tris(p-nonylphenyl) phosphite, tri-n-butyl phosphate, or triphenyl phosphate, respectively in amounts of 0.01 – 1.0 percent by weight.

Suitable further additives are the customary heat and oxidation stabilizers, such as sterically hindered phenols or secondary aromatic amines, as well as pigmenting agents, such as titanium dioxide, which are added to the reaction mixture.

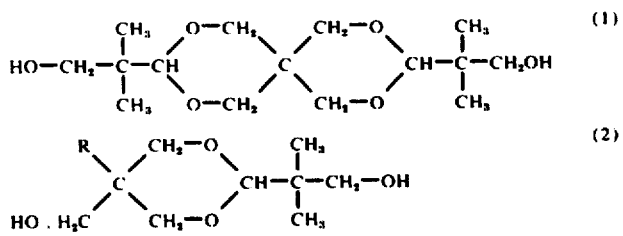

(1)

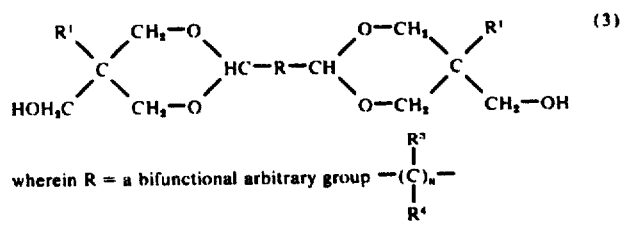

(2)

wherein R = $CH_3$, $C_2H_5$

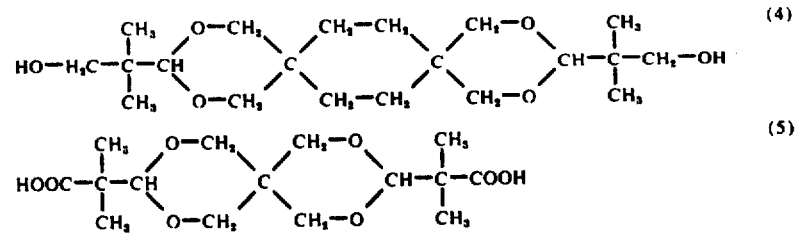

(3)

wherein R = a bifunctional arbitrary group $-(\overset{R^3}{\underset{R^4}{C}})_n-$ wherein $R^3$, $R^4$ = H, $CH_3$, $C_2H_5$, $C_3H_7$, $C_4H_9$; 1,4-cyclohexylidene; or 1,4-phenylene,
$R^1$, $R^2$ = $CH_3$, $C_2H_5$.

(4)

(5)

The polyesters thus obtained having solution viscosities of between 0.4 and 0.8 dl./g., preferably between 0.5 and 0.7 dl./g. are melt spun.

The threads obtained in a conventional melt spinning process, or the staple fibers produced therefrom and/or woven or knitted fabrics manufactured from fibers or threads in the customary processes are subjected to the after-treatment of the present invention, leading to the actual, pilling-resistant product. This after-treatment comprises exposing the threads, fibers, woven fabrics or knits to dilute aqueous acids, optionally in the presence of wetting agents, emulsifiers, or carriers. Suitable aqueous acids are basically all aqueous solutions of materials which dissociate under the liberation of hydrogen ions. Among these are especially dilute mineral acids, such as hydrochloric acid, sulfuric acid, phosphoric acid, nitric acid, acetic acid, propionic acid, butyric acid, oxalic acid, citric acid, maleic acid, malonic acid, lactic acid, and furthermore acidic salts, such as $KHSO_4$, $NaH_2PO_4$, ammonium salts of strong acids, such as those of sulfuric acid or hydrochloric acid; and also organic acid salts, such as ethylamine hydrochloride or pyridinium sulfate.

The concentration of the acid can be varied within wide limits and this concentration depends primarily on the strength of the acid being used, and thus it can range, for example, between 0.00001 and 20 percent by weight. Thus, aqueous hydrochloric acid is advantageously employed in concentrations of between 0.00001 and 5 percent, preferably 0.0001 and 1 percent, while acetic acid is used at concentrations of between 0.001 and 20 percent, preferably 0.01 and 10 percent. However, the concentration also is dependent on the other conditions of the after-treatment, such as duration of the treatment and the treatment temperature.

The duration can be very brief, especially in the case of a fine fiber denier and when a stronger or more concentrated acid is used, for example a few seconds, but the time can also be longer, i.e., up to several hours, especially in case of a stronger denier, when using highly dilute acids, or when the acid is to penetrate more deeply into the fiber. Preferably, a range of 1 minute to up to 2 hours is utilized. The acid concentration and the duration of the treatment depend greatly on the temperature employed during the process. Suitably, the process is carried out at a temperature of between 0° and about 100° C, although it is, of course, also possible to use the method at a still higher temperature in a pressurized vessel. Preferably, temperatures are used of between 20° and 100° C.

All of the parameters, such as acid concentration, strength of the acid, treatment temperature and duration of the treatment thus are dependent upon one another to a great extent and in order to obtain the optimum effect, the individual values are readily adapted to one another by means of a few preliminary tests, suitably within the scope of the indicated numerical data.

It has proved to be especially advantageous and economical to effect the after-treatment during an operating step which is carried out during the manufacturing of textiles. In this connection, the carrier dyeing method offers special advantages, since in the usual mode of operation with a weakly acidic medium of pH 4-5, for 2 hours, at 100° C, this method is sufficient without any further additives to attain the desired hydrolytic degradation.

The effect of an improved pilling resistance obtained by the after-treatment is proven suitably by detecting a lowering in the flexural strength of the melt-spun polyester fibers after the treatment. The flexural strength is determined by using the single strand cross breaking values (abbreviated hereinbelow as SV) in accordance with K. H. Gruenewald, "Chemiefasern", Vol. 12, page 853 (1962).

The following examples explain the present invention without, however, limiting the same thereto.

EXAMPLE 1.

The following ingredients are introduced into an interesterification reactor having a capacity of 100 liters, equipped with an agitator, a double heating mantle, and a fractionating column:

38.8 kg of dimethyl terephthalate (DMT)
0.304 kg of the spirocyclic acetaldiol 1 (0.5 molar percent, based on DMT)

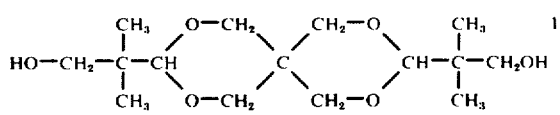

24.8 kg of ethylene glycol
0.0388 kg of calcium acetate.

The mixture is heated, and at about 150° C methanol begins to distill off. After the separation of methanol has ceased at 200° C, which is the case generally after 3 hours at the latest, the interesterification product is transferred into the polycondensation reactor which has the same capacity. Then, 0.0388 kg of triphenyl phosphate and 0.0116 kg of antimony oxide ($Sb_2O_3$) are added to the reaction mixture. Subsequently, the temperature is progressively increased to 280° C, while the pressure is being lowered gradually to about 0.1 torr (mm.Hg). The polycondensation is terminated when the energy absorption during the agitation of the reactor content corresponds to a melt viscosity at 285° C of about 1,000 poises.

The polyester melt is then squeezed in the form of thin ribbons through a nozzle plate at the bottom of the reactor. The ribbons are cooled in cold water and then cut into small cylinders having a length of about 5 mm. and a diameter of 2 – 3 mm.

The RSV value of the colorless polyester (measured in phenol/tetrachloroethane 60/40 at 25° C) is 0.57 dl./g. and the melting point (determined by means of the monoscope of Bock Company, Bad Oeynhausen) is 255° C. The melt viscosity (determined by means of a high pressure capillary viscometer of the Zwick Company) at 285° C is 1,100 poises.

The material is spun through a spinneret having 20 holes of a diameter of 0.25 mm. at a spinning temperature of 302° C, thus obtaining threads which are reeled up with a take-off speed of 640/meters/min. and then stretched to a ratio of 1:3.88.

Thereafter, the threads have the following properties:

| Denier | 84/20 dtex |
|---|---|
| Tensile strength | 3.9 p/dtex |
| Elongation | 27 percent |

Thereafter, the SV values are determined on 48 climatized (23° C, 50 percent relative atmospheric humidity) individual capillaries and the average value from these individual data is 2,380 strokes.

The threads are reeled up on a holder making it possible to insert the threads in an after-treatment bath so that all threads are wetted by this bath. The composition of the after-treatment bath, the duration and the temperature of the after-treatment are compiled in Table 1. After the treatment, the threads are washed repeatedly with distilled water, dried, and climatized (23° C, 50 percent relative atmospheric humidity). The SV value of the after-treated threads was likewise measured on 48 individual capillaries and the average values from these individual determinations are indicated in Table 1.

COMPARATIVE EXAMPLE

Threads made from a polyester produced under similar conditions, but without adding the spirocyclic acetaldiol 1 having the characteristics:

| RSV value | 0.60 dl./g |
|---|---|
| Melting point | 258° C |
| Denier | 84/20 |
| Tensile strength | 41 p/dtex |
| Elongation | 22.8 percent | have an SV value of 2,520 strokes.

The SV values in accordance with the various after-treatments are set forth in Table 1.

EXAMPLE 2.

In accordance with Example 1, a polyester is produced from the following components:
38.8 kg of dimethyl terephthalate
0.608 kg of the spirocyclic acetaldiol 1 (1.0 molar percent, based on DMT)
24.8 kg of ethylene glycol
0.0149 kg of zinc acetate (anhydrous).

After the interesterification, 0.0194 kg of triphenyl phosphate and 0.0116 kg of antimony oxide are added thereto in accordance with Example 1.

The polyester has a melting point of 251° C, as well as an RSV value of 0.57 dl./g. The polyester can be readily spun; the threads are tested as described in Example 1.

| Denier | 81/20 dtex |
|---|---|
| Tensile strength | 3.5 p/dtex |
| Tensile elongation (Elongation at rupture) | 25 percent |
| SV value | 2,130 strokes |

The type of after-treatment and the SV values after the after-treatment are indicated in Table 1.

By using a polyester having 0.1 or 2.5 molar percent of the acetaldiol 1, a comparable result is attained by the acid treatment.

EXAMPLE 3.

For the hydrolyzable co-component, the charge is combined with 0.436 kg of the acetaldiol 2

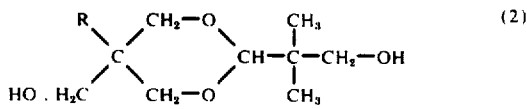

wherein R = CH$_3$, C$_2$H$_5$ (1.0 molar percent, based on DMT)

The thus obtained polyester has a melting point of 259° C and an RSV value of 0.60 dl./g. The polyester can be readily spun. The values of the thread test are as follows:

| Denier | 79/20 dtex |
|---|---|
| Elongation | 26 percent |
| Tensile strength | 3.2 p/dtex |
| SV value | 2,400 strokes |

See Table 1 regarding the values following the after-treatment.

EXAMPLE 4.

In accordance with Example 1, a polyester is prepared from the following components:
38.8 kg of dimethyl terephthalate
0.720 kg of the dimethyl ester of the spirocyclic dicarboxylic acid 3 (1.0 molar percent, based on DMT)

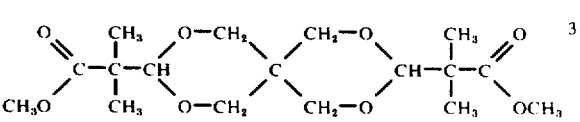

24.8 kg of ethylene glycol
0.0149 kg of zinc acetate (anhydrous).

After the interesterification, 0.0194 kg of triphenyl phosphate and 0.0116 kg of antimony oxide are added to the reaction mixture in accordance with Example 1.

The thus obtained polyester has a melting point of 249° C and an RSV value of 0.59 dl./g. The polyester can be easily spun; the threads are tested as described in Example 1.

| Denier | 78/20 dtex |
|---|---|
| Tensile strength | 3.4 p/dtex |
| Tensile elongation (Elongation at rupture) | 27 percent |
| SV value | 2,040 strokes |

The type of after-treatment and the SV values after the after-treatment can be seen from Table 1.

When using, instead of the acetal component 3, any of the following bifunctional compounds, comparable results are obtained:

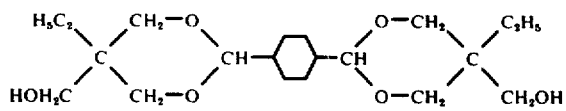

-continued

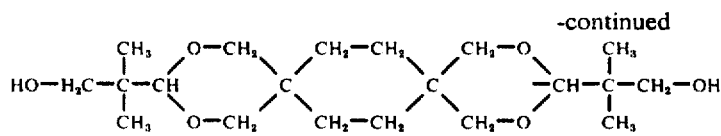

or

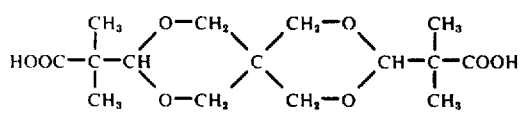

TABLE 1.

|  | SV Value (Stokes) | Example 1 | Comparative Example | Example 2 | Example 3 | Example 4 |
| --- | --- | --- | --- | --- | --- | --- |
|  | Without Aftertreatment | 2,380 | 2,520 | 2,130 | 2,400 | 2,040 |
| After-treatment with[1] | 1% HCl/1 min./20° C | 2,290 | 2,570 | 1,050 | 950 | 830 |
|  | 1% HCl/60 min/20° C | 2,350 | 2,490 | 720 | 620 | 580 |
|  | 1% HCl/1 min/100° C | 1,150 | 1,470 | 700 | 690 | 490 |
|  | 1% HCl/60 min/100° C | 1,010 | 2,490 | 550 | 500 | 380 |
|  | 10% HCl/1 min/20° C | 1,090 | 2,500 | 640 | 540 | 520 |
|  | 10% HCl/60 min/20° C | 1,020 | 2,530 | 510 | 470 | 470 |
|  | 10% HCl/1 min/100° C | 990 | 2,480 | 560 | 490 | 530 |
|  | 10% HCl/60 min/100° C | 860 | 2,410 | 490 | 430 | 400 |
|  | Conditions of Carrier Dyeing 120 min/100° C[2] | 890 | 2,470 | 510 | 480 | 410 |

[1]Bath ratio in all experiments 1 : 40
[2]The dye liquor contains 3 g/l of "Levepal PT", 1% "Uniperol W", 2 g/l of (NH$_4$)$_2$SO$_4$ and was set to a pH of 4.5 – 5 by means of formic acid.

When aqueous sulfuric acid is used under the same conditions, comparable results are achieved; with the addition of 10 percent acetic acid, the time and/or the temperature must be increased to obtain similar SV values; the same holds true when 10 percent KHSO$_4$ solution is used.

Table 1 demonstrates the excellent effectiveness of the process according to the present invention. While the flexural strength (expressed by the SV values) of threads made of unmodified poly(ethylene terephthalate). (Comparative Example) is not altered by dilute acids, the flexural strength of the polyester threads which contain acetal groups is very greatly reduced by the after-treatment of the present invention to SV values as found for pilling-resistant polyester threads of the same denier.

Woven fabrics and knits manufactured from the fibers and threads treated in accordance with the present invention do not show any pilling.

The same effect is obtained when processing polyesters, which contain acetal groups, into fibers and threads and directly manufacturing woven fabrics or knits therefrom. Whereas these textile products do exhibit the undesired pilling, the latter is eliminated if the woven fabrics and knits are pretreated in accordance with the present invention with aqueous acids as set forth in the Examples.

We claim:
1. In the method for producing pilling-resistant fiber products from polyesters containing 0.5 to 5.0 molar percent, based on the acid component of a compound containing acetal groups which is bifunctional with respect to the polyesterification, the improvement comprising treating threads and fibers produced from said polyesters with aqueous acids.

2. The method of claim 1, wherein said aqueous acids have an acid concentration of 0.00001 to 20 percent by weight, the temperature of treatment is about 0° – 100° C and the time of treatment is about 1 minute to 2 hours.

3. The method of claim 2, wherein said compound is

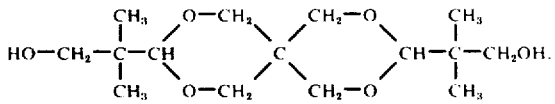

4. The method of Claim 2, wherein said compound is

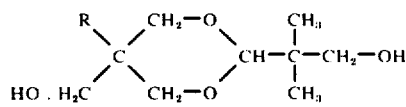

wherein R = CH$_3$ or C$_2$H$_5$.

5. The method of Claim 2, wherein said compound is

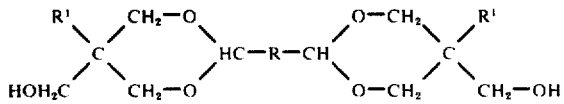

wherein R = a bifunctional arbitrary group $-(\overset{R^3}{\underset{R^4}{C}})_n-$ and
wherein R$^3$, R$^4$=H, CH$_3$, C$_2$H$_5$, C$_3$H$_7$, C$_4$, H$_9$; 1,4-cyclohexylidene; or 1,4-phenylene, and
R$^1$, R$^2$ = CH$_3$ or C$_2$H$_5$.

6. The method of Claim 2, wherein said compound is

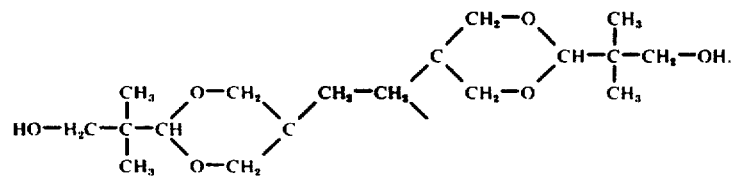
7. The method of claim 2, wherein said compound is
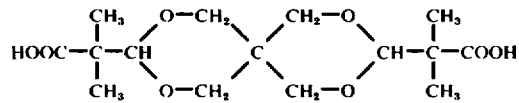
* * * * *